United States Patent [19]
Ball et al.

[11] Patent Number: 5,189,678
[45] Date of Patent: Feb. 23, 1993

[54] COUPLING APPARATUS FOR A METAL VAPOR LASER

[75] Inventors: Don G. Ball, Livermore; John L. Miller, Dublin, both of Calif.

[73] Assignee: The United States of America as represented by the United States Department of Energy, Washington, D.C.

[21] Appl. No.: 915,197

[22] Filed: Sep. 29, 1986

[51] Int. Cl.$^5$ .................................. H01J 3/10
[52] U.S. Cl. .................................. 372/28; 372/35
[58] Field of Search .............. 372/28, 35; 328/65; 330/157; 315/170, 242; 307/106, 112, 132

[56] References Cited

U.S. PATENT DOCUMENTS

| | | | |
|---|---|---|---|
| 3,646,395 | 2/1972 | De Pratti | 372/38 |
| 4,075,537 | 2/1978 | Quillfeldt | 372/38 X |
| 4,207,540 | 6/1980 | Ernst | 372/38 |
| 4,245,194 | 1/1981 | Fahlen et al. | 372/38 |
| 4,275,317 | 6/1981 | Laudenslager et al. | 372/38 |
| 4,288,758 | 9/1981 | Seguin et al. | 372/38 |
| 4,444,236 | 1/1985 | Sutter, Jr. | 372/25 |

*Primary Examiner*—Mark Hellner
*Attorney, Agent, or Firm*—Roger S. Gaither; L. E. Carnahan; William R. Moser

[57] ABSTRACT

Coupling apparatus for a large bore metal vapor laser is disclosed. The coupling apparatus provides for coupling high voltage pulses (approximately 40 KV) to a metal vapor laser with a high repetition rate (approximately 5 KHz). The coupling apparatus utilizes existing thyratron circuits and provides suitable power input to a large bore metal vapor laser while maintaining satisfactory operating lifetimes for the existing thyratron circuits.

7 Claims, 4 Drawing Sheets

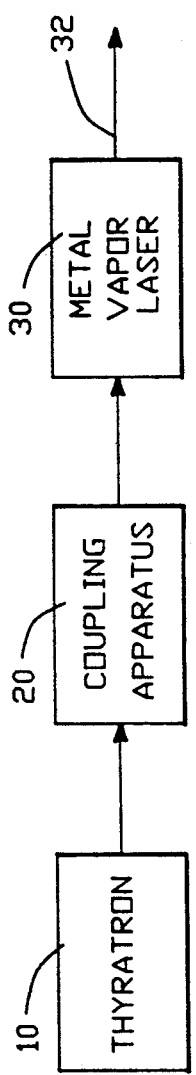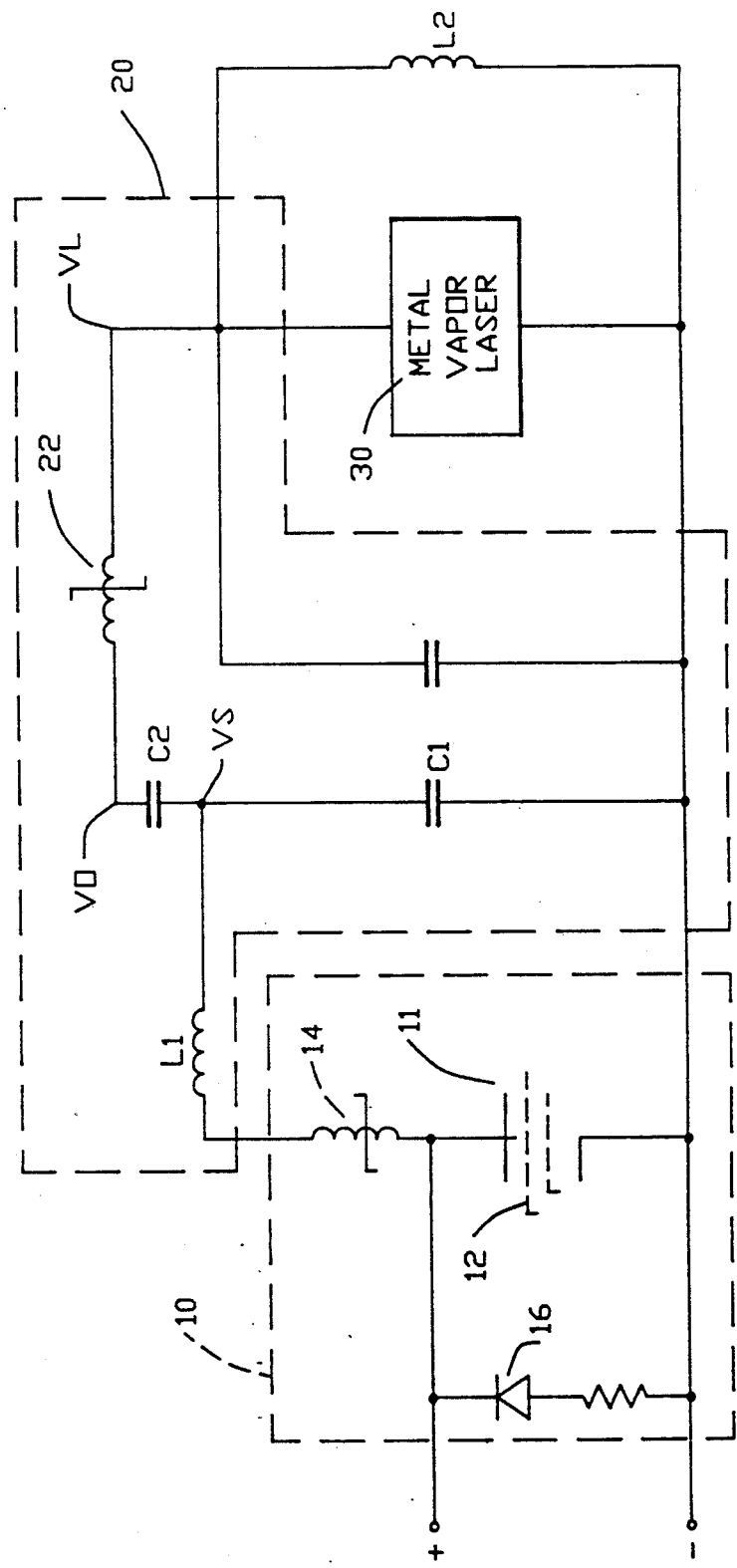
FIG.-1
FIG.-2

COUPLING APPARATUS FOR A METAL VAPOR LASER

The United States Government has rights in this invention pursuant to Contract No. W-7405-ENG-48 between the United States Department of Energy and University of California for the operation of the Lawrence Livermore National Laboratory.

BACKGROUND OF THE INVENTION

The present invention relates to metal vapor lasers and more particularly to a coupling apparatus for coupling high voltage pulses at a high repetition rate to metal vapor lasers, such as copper vapor lasers, and more particularly large bore metal vapor lasers.

With large bore copper vapor lasers, it is frequently desired that very high output laser power be generated. Large bore copper vapor lasers require the application of very high amplitude voltage pulses with high repetition rates in order to generate suitable output power.

A device known as a thyratron is typically used to generate high amplitude voltage pulses. A thyratron is a hot cathode gas-filled tube with one or more grids placed between the cathode and anode.

As described above, large bore copper vapor lasers require the application of very high voltage pulses as well as very high pulse repetition rates in order to provide improved laser capability (i.e., improved power characteristics). A problem with attempting to provide very high voltage pulses (e.g., voltage pulses having amplitudes of 40 KV and higher) at high repetition rates (e.g., pulse rates of 5 KHz or greater) is that thyratron circuits do not provide sufficiently high voltage pulses having a sufficiently fast rise time to meet both requirements at one time. In addition, the input requirements of large bore metal vapor lasers become too demanding for thyratrons to be operated with a satisfactory lifetime. One reason for the foregoing deficiency is that the rate of rise of current (di/dt) and the peak current on existing thyratrons becomes excessive with large bore metal vapor lasers, which consequently reduces the expected operating lifetime.

A circuit known as a Blumlein circuit has been utilized for radar techniques. A Blumlein circuit is a type of voltage doubler circuit and provides, with suitable switching of transmission lines or capacitors, for an increased or higher voltage (in terms of amplitude). The higher voltage can then be coupled to a radar circuit. However, Blumlein-type circuits have generally not been known for coupling sufficiently high voltage pulses with suitably high repetition reats to metal vapor lasers, as indicated above.

There is a need therefore for a more efficient means of achieving a coupling capability using thyratron circuits for use with large bore metal vapor lasers with high voltage pulses together with high repetition rates while at the same time maintaining a suitable operating life for the thyratron circuits.

SUMMARY OF THE INVENTION

It is an object of the present invention to provide an improved coupling circuit for a metal vapor laser.

It is a more particular object to provide an improved coupling circuit which provides for higher voltage and higher repetition rates for a large bore metal vapor laser.

It is still another object to provide an improved coupling circuit utilizing thyratron circuits which maintains a suitable operating lifetime for the thyratron circuits.

Briefly, the apparatus includes thyratron means for generating a series of high amplitude voltage pulses which have a predetermined repetition rate and which are connected to the coupling apparatus. The coupling apparatus responds to the series of pulses by increasing the voltage pulses to a higher amplitude.

The coupling apparatus includes peaking switch means which, in effect, provide suitable coupling of the pulses to the metal vapor laser. At the same time, the coupling apparatus limits peak current in the thyratron means, as well as limiting the rate of rise of current (di/dt) in the thyratron means, which aids in maintaining a suitable operating life.

In accordance with the foregoing summary, the present invention achieves the objects of providing an improved coupling apparatus for a large bore metal vapor laser.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of this specification, illustrate an embodiment of the invention and, together with the description, serve to explain the principles of the invention.

FIG. 1 depicts a block diagram of a coupling apparatus for a large bore metal vapor laser.

FIG. 2 depicts a schematic diagram of a coupling apparatus for use with a metal vapor laser according to the present invention.

DETAILED DESCRIPTION OF THE DRAWINGS

Figure 3:
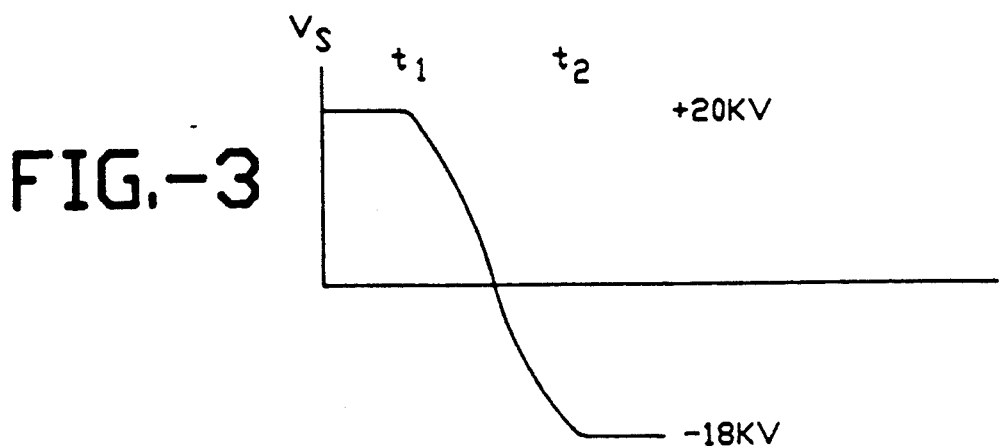
FIGS. 3-6 depict timing diagrams for illustrating the operation of the present invention depicted in FIG. 2.

Reference will now be made in detail to a preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Referring now to FIG. 1, a block diagram of a coupling apparatus for a large bore metal vapor laser is depicted.

In FIG. 1, a thyratron circuit is connected to a coupling apparatus 20 which in turn is connected to a large bore metal vapor laser 30. The thyratron circuit 10 is itself known in the art and need not be described in great detail. The purpose of thyratron circuit 10 is to generate and apply a series of high voltage, high repetition rate pulses to coupling circuit 20. The high voltage pulses are desirably 20 KV or thereabouts and the repetition rate is desirably 5 KHz or higher.

Coupling apparatus 20 is responsive to the first series of high voltage, high repetition rate pulses from thyratron circuit 10 and in response thereto increases the high voltage pulses to a second series of pulses having a higher amplitude voltage, desirably in the range of 38 KV to 40 KV. Coupling apparatus 20 couples the higher voltage (38–40 KV), high pulse rate (5 KHz or more) pulses to metal vapor laser 30 (desirably a copper vapor laser).

Because coupling apparatus 20 applies the higher voltage, high repetition rate pulses to laser 30, a much more efficient and powerful laser beam 32 can be generated. Moreover, as will be described, coupling apparatus 20 provides for an improved laser beam generation while at the same time improving or maintaining the normal operating life of thyratron circuit 10. This is to be contrasted with attempting to operate the thyratron itself at the high voltage, which would be impractical, since its useful operating life would be too short, for the reasons previously indicated.

Referring now to FIG. 2, a schematic diagram of a coupling apparatus according to the present invention is depicted. As previously described, the present invention is intended to be utilized with metal vapor type lasers, particularly a large bore copper vapor laser. Large bore lasers can be characterized as lasers having a bore diameter of approximately six centimeters or more. With the development of large bore metal vapor lasers, it has been found that there is a corresponding requirement for higher amplitude voltage pulses to be applied to the laser.

As previously described, thyratron circuits provide a means of applying high voltage pulses to the laser equipment. However, there are two problems with existing thyratron circuits. First, the voltage amplitude pulses generated are generally not sufficiently large enough and fast enough for the operating requirements of large bore metal vapor lasers.

In addition, increasing the power output of metal vapor lasers limits the overall operating lifetime of the thyratron circuit, as previously discussed.

Referring now to FIG. 2, the present invention provides an improved coupling apparatus 20 for coupling the output of a thyratron circuit 10 to a metal vapor laser 30 with sufficiently high voltage amplitude pulses (e.g., 38–40 KV) at a high repetition rate (e.g., 5 KHz or more) while at the same time maintaining a suitable operating lifetime of the thyratron circuit 10.

In FIG. 2, thyratron circuit 10 receives suitable trigger pulses from a known source (not shown) applied through grid 12. The pulses typically have a repetition rate of 5 KHz and are applied through grid 12 to thyratron 10 in a known fashion. In response thereto, thyratron tube 11 generates a series of high voltage pulses for connection to the coupling apparatus 20, the purpose of which is to generate very high voltage pulses with the same repetition rates for coupling to metal vapor laser 30. The thyratron circuit 10 includes magnetic assist coil 14, which serves to delay the rise of current through thyratron 10, thus aiding in maintaining a suitable operating lifetime. The inverse diode 16 is provided to permit reverse current to pass around the thyratron circuit 10, rather than arc through thyratron tube 11, which could result in a reduced lifetime.

Thyratron circuit 10 generates 20 KV series pulses when triggered by a corresponding series of trigger pulses on grid 12. However, in a desirable application, laser circuit 30 requires approximately 40 KV pulses with sufficient pulse repetition rates of 5 KHz or more, which is beyond the normal operating capabilities of a typical thyratron circuit.

In FIG. 2, a first inductor L1 receives the high voltage pulses from thyratron circuit 10 (through magnetic assist coil 14). The purpose of inductor L1 is to, in effect, aid in limiting the peak current through thyratron 10 and provide for suitable voltage reversal of capacitor C1.

Referring now to FIG. 3, a timing diagram illustrating the charging across capacitor C1 in FIG. 2 is depicted. In FIG. 3, a trigger pulse occurs at time T1 and the charge VS across capacitor C1 will "reverse" from the indicated +20 KV at time T1 to approximately −18 KV at time T2. This charging of capacitor C1 to a charge of from +Q to −Q occurs in approximately 150–300 nanoseconds through the loop formed by C1, L1, coil 14 and thyratron circuit 10.

Inductor L1 has a value of approximately 400 nanohenries, which when taken in conjunction with the value of capacitor C1 (approximately 6 nanofarads) provides for a suitable time constant (L1C1) in the time frame indicated above.

Figure 4:
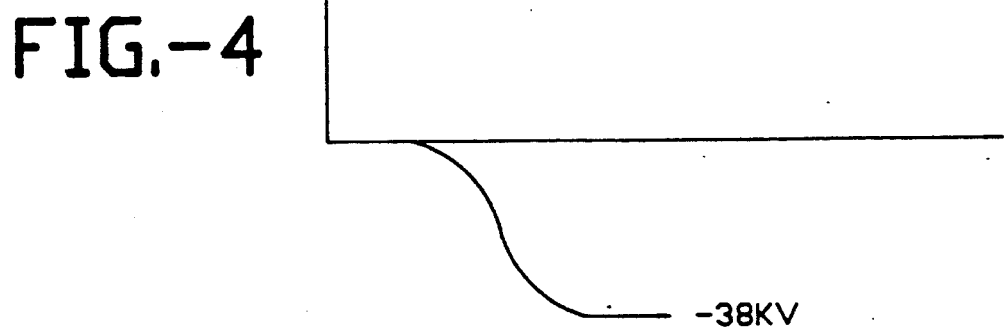

In FIG. 4, at time T1, the voltage V0 is the voltage across capacitor C2 and C1 of FIG. 2 which charges in the same time frame to approximately −38 KV.

As can be seen from FIG. 2, capacitors C1 and C2, when "connected" in series, will form approximately a doubled voltage (20 KV + 18 KV) or approximately 38 KV. This increased higher voltage developed across capacitors C1 and C2 can now be applied to laser circuit 30 through peaking switch 22.

Figure 5:
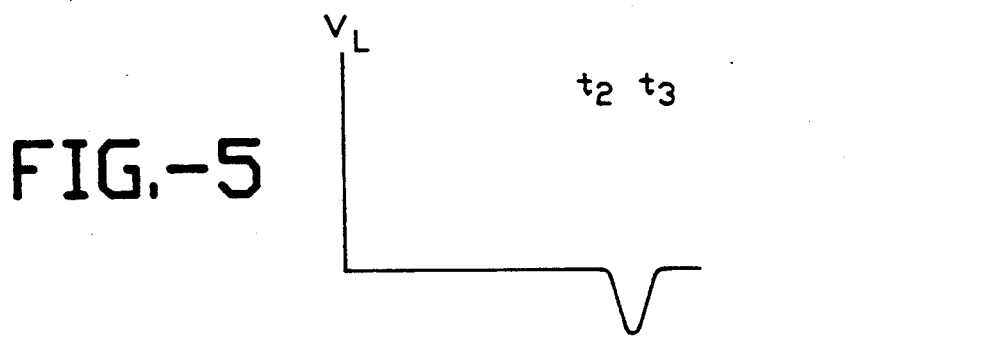

The voltage VL indicated in FIG. 2 to be applied to laser circuit 30 is the voltage combination across capacitor C1, C2 applied through peaking switch 22. At time T2, the discharge of capacitors C1 and C2, through peaking switch 22 is illustrated in FIG. 5. The time frame between times T2 and T3 is approximately 100 nanoseconds.

Figure 6:
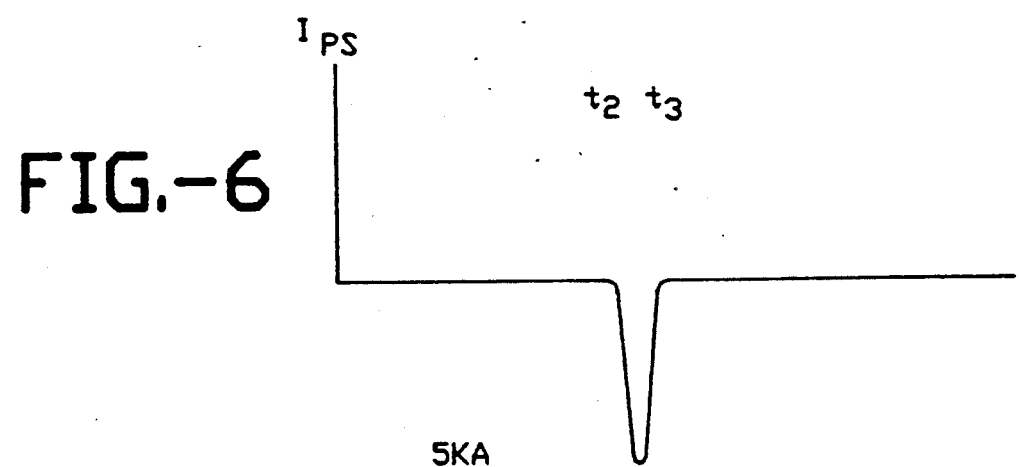

Capacitors C1 and C2 are connected, at the appropriate time, through peaking switch 22 to the load (laser 30). The peaking switch 22 develops a current flow as illustrated in FIG. 6, with the current peaking at approximately 5 KA. The peaking switch 22 initially looks to the rest of the coupling circuit as a large inductor (initially to time T2). At time T2 to T3, peaking switch 22 appears as a small inductor and couples the higher voltage (approximately 38 KV) to laser circuit 30. Inductor L2 in FIG. 2 is a chargin inductor, and has a value typically of 200 microhenries.

As can be seen, the coupling circuit 20 provides, by means of peaking circuit 22, suitable coupling of larger amplitude pulses with high repetition rates to a large bore metal vapor laser circuit 30.

Figure 7:
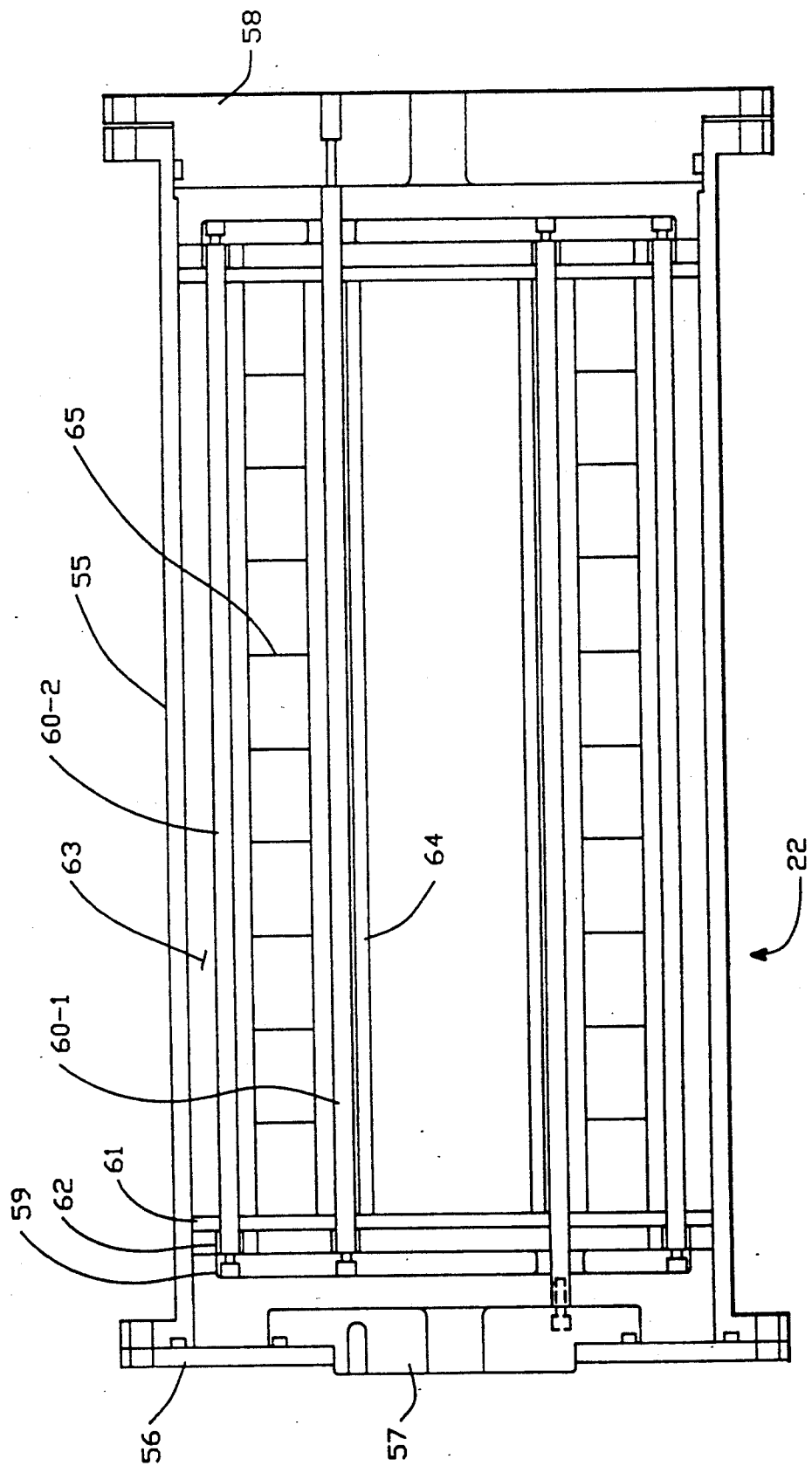
FIG. 7 depicts a schematic diagram of a magnetic peaking switch which forms a portion of the coupling apparatus of FIG. 2.

Referring now to FIG. 7, a cross-sectional view of the magnetic peaking switch 22 of FIG. 2 is illustrated. The specific design characteristics, in a preferred embodiment, of magnetic peaking switch 22 are determined by the general parameters, such as illustrated below:

TABLE I

| Parameter | Value |
|---|---|
| Peak charge voltage | 40 KV |
| Time to saturate (T2-T1) | 150–300 ns |
| Reset current | Approx. 10 amperes |
| Saturated inductance | Approx. 100 nh |
| Leakage current (maximum) | 20 amperes |
| Losses | Less than 10% |

In a preferred embodiment, a suitable type of ferrite material utilized with the peaking switch is a ferrite material from the Stackpole Corporation of St. Marys, Pa., which manufactures a ferrite material known as CERAMAG 7D. That ferrite material provides the suitable parameter characteristics illustrated above which are desired for switching operation.

In FIG. 7, the peaking switch includes a switch container 55 coupled to an end cover 58. The switch container 55 is also connected at the other end to an insulator plate 56 which insulates the switch from center contact 57. A rod plate 59 supports an inner conditioning rod 60-1 and an outer conditioning rod 60-2.

In FIG. 7, two core retainers 61 are illustrated as are spacer sleeves 62. Also in FIG. 7, a centering rib 63 is illustrated with center tube 64 and core spacer film 65.

Figure 8:
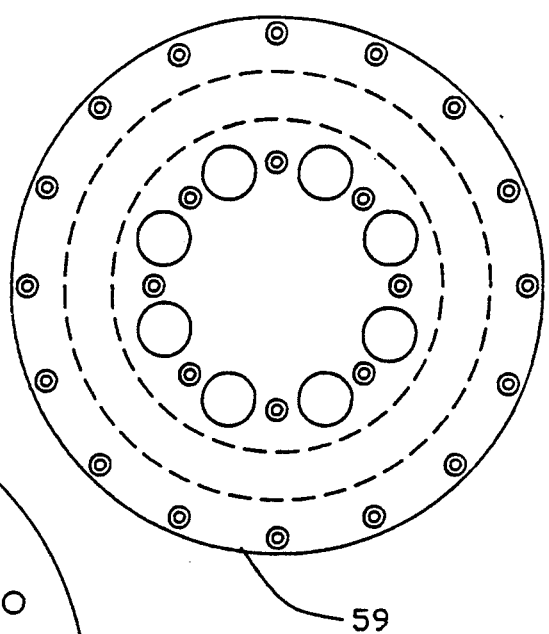
FIG. 8 depicts a cross-sectional view of a rod plate which forms a portion of FIG. 7.
Figure 9:
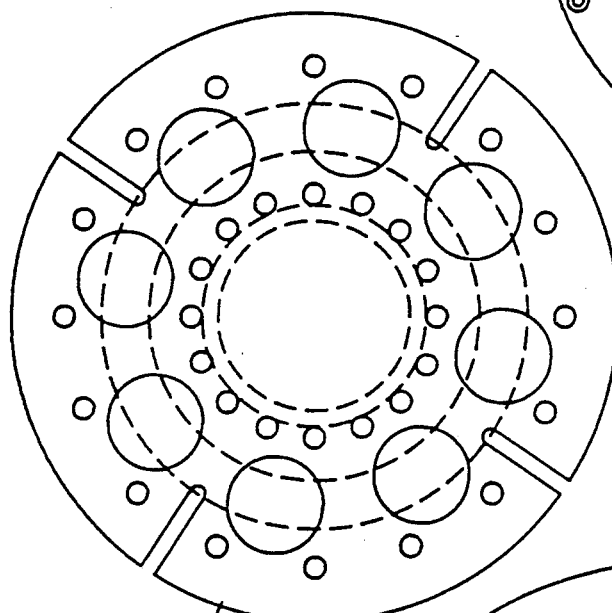
FIG. 9 depicts a cross-sectional view of a core retainer which forms a portion of FIG. 7.

FIG. 8 depicts a cross-sectional view of the rod plate 59 of FIG. 7, and FIG. 9 depicts a cross-sectional view of the core retainer 61 of FIG. 7.

Figure 10:
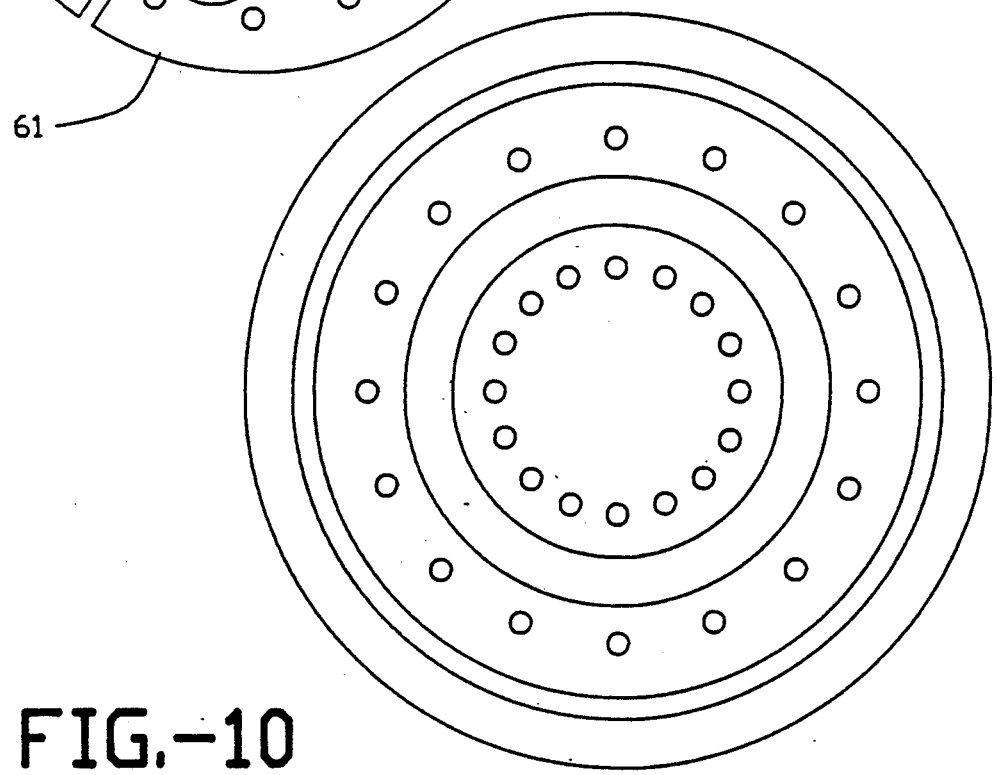
FIG. 10 depicts a cross-sectional view of a ferrite core and housing which forms a portion of FIG. 7.

FIG. 10 depicts the placement of the ferrite core and housing of peaking switch 22, the parameters of which are illustrated in TABLE I above.

As has been described, the invention herein described provides for improved performance of a large bore, metal vapor laser by providing a faster coupling apparatus than prior art devices. The coupling apparatus provides very high amplitude pulses with suitably high repetition rates which enables higher laser performance while still providing suitable operating lifetimes for the thyratron circuits.

The foregoing description of a preferred embodiment of the invention has been presented for purposes of illustration and description. It is not intended to be exhaustive or to limit the invention to the precise form disclosed, and obviously many modifications and variations are possible in light of the above teaching. For instance, other possible applications could be small bore lasers having a long discharge tube and gas discharge lasers. The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Coupling apparatus for a metal vapor laser comprising
    thyratron means for generating a first series of voltage pulses having a first amplitude and a first high repetition rate,
    coupling means responsive to said first series of pulses for increasing said amplitude to a second amplitude higher than said first amplitude, thereby forming a second series of pulses at said first repetition rate, said coupling means for coupling said second series of pulses having said second amplitude to said metal vapor laser wherein said coupling means include peaking switch means for coupling said second series of pulses to said laser,
    first capacitor means for charging to a first voltage corresponding approximately to said first amplitude, second capacitor means for charging to a second voltage corresponding approximately to said first amplitude, and
    means for connecting in series said charges on said first and second capacitor means to said metal vapor laser, thereby increasing said first amplitude to said second amplitude.

2. Coupling apparatus as in claim 1 wherein said laser is a large bore laser.

3. Coupling apparatus as in claim 1 wherein said laser is a small bore laser.

4. Coupling apparatus as in claim 1 wherein said coupling means include first inductor means connected to receive said first series of pulses to limit the rise of current through said thyratron means.

5. Coupling apparatus for a large bore metal vapor laser comprising
    thyratron means for generating a repetitious series of high voltage pulses, said thyratron circuit energized by a series of high repetition trigger pulses to generate said high voltage pulses,
    inductor means connected to said thyratron circuit for receiving said pulses to limit the rise of current through said thyratron circuit.
    first capacitor means for charging to a first voltage at a rate corresponding to the repetition rate of said first series,
    second capacitor means for charging to a second voltage corresponding approximately to said first voltage, and
    peaking switch means for connecting said first and second charges in series to said metal vapor laser thereby increasing said high voltage pulses to higher voltage pulses.

6. Coupling apparatus for a large bore metal vapor laser comprising
    thyratron means for generating a first series of voltage pulses having a first amplitude and a first repetition rate,
    coupling means responsive to said first series of pulses for increasing said first amplitude to a second amplitude higher than said first amplitude, thereby forming a second series of pulses at said first repetition rate, said coupling means including peaking switch means for coupling said second series of pulses having said second amplitude to said large bore metal vapor laser,
    first capacitor means for charging to a first voltage corresponding approximately to said first amplitude,
    second capacitor means for charging to a second voltage corresponding to said first amplitude, and
    means for connecting in series said charges on said first and second capacitor means to said metal vapor laser, thereby increasing said first amplitude to said second amplitude.

7. In a coupling apparatus for a large bore metal vapor laser wherein said laser includes a thyratron circuit for generating a first series of voltage pulses having a first amplitude and a first repetition rate, and wherein said coupling apparatus is responsive to said first series of pulses for increasing said first amplitude to a second amplitude, higher than said first amplitude, thereby forming a second series of pulses, at said first repetition rate, the improvement wherein said coupling means includes peaking switch means for coupling said second series of pulses having said second amplitude to said large bore metal vapor laser, first capacitor means for charging to a first voltage corresponding approximately to said first amplitude, second capacitor means for charging to a second voltage corresponding to said first amplitude, and means for connecting in series said charges on said first and second capacitor means to said metal vapor laser, thereby increasing said first amplitude to said second amplitude.

* * * * *